United States Patent [19]
Beck

[11] Patent Number: 5,435,421
[45] Date of Patent: Jul. 25, 1995

[54] HYDRAULIC, ADJUSTABLE VIBRATION DAMPER AND A VALVE SYSTEM FOR A HYDRAULIC, ADJUSTABLE VIBRATION DAMPER

[75] Inventor: Hubert Beck, Eitorf, Germany
[73] Assignee: Fichtel & Sachs AG, Eitorf, Germany
[21] Appl. No.: 147,972
[22] Filed: Nov. 5, 1993
[30] Foreign Application Priority Data
  Nov. 7, 1992 [DE] Germany ............ 42 37 666
[51] Int. Cl.⁶ ................................. F16F 9/346
[52] U.S. Cl. ........................ 188/299; 188/322.19
[58] Field of Search ........... 188/299, 313, 322.13; 280/707; 277/167.5

[56] References Cited
U.S. PATENT DOCUMENTS

| | | | |
|---|---|---|---|
| 4,720,078 | 1/1988 | Nakamura | 251/129.01 |
| 4,960,188 | 10/1990 | Wössner | 188/299 |
| 4,988,073 | 1/1991 | Cristiani | 251/129.01 |
| 5,040,714 | 8/1991 | McManigal | 277/167.5 |
| 5,265,703 | 11/1993 | Ackermann | 188/299 |
| 5,301,776 | 4/1994 | Beck | 188/299 |

FOREIGN PATENT DOCUMENTS

| | | |
|---|---|---|
| 3800288 | 6/1989 | Germany . |
| 3800288 | 6/1989 | Germany . |
| 3936453 | 5/1991 | Germany . |
| 4137330 | 11/1992 | Germany . |
| 9209505 | 11/1992 | Germany . |
| 9209505 | 11/1992 | Germany . |

OTHER PUBLICATIONS

Handbuch der Dichtungstechnik, Edgar Schmid Grafenau/Württ, Expert Verlag, 1981.
Seals and Sealing Handbook–Gulf Publishing Company–pp. 40, 41, 113, 140–143, 156.

*Primary Examiner*—Robert J. Oberleitner
*Assistant Examiner*—Clifford T. Bartz
*Attorney, Agent, or Firm*—Nils H. Ljungman & Associates

[57] ABSTRACT

Hydraulic, adjustable vibration damper with a piston fastened to a piston rod, which piston divides a work cylinder into two work chambers filled with damping fluid, whereby at least partly to control the damping force, there is a valve system with at least one electromagnetically activated valve, respectively consisting of a housing, a coil, an armature and a nonreturn body. There is a seal element to prevent the penetration of moisture between the coil, which is encased in a plastic material, and the nonreturn body.

18 Claims, 8 Drawing Sheets

HYDRAULIC, ADJUSTABLE VIBRATION DAMPER AND A VALVE SYSTEM FOR A HYDRAULIC, ADJUSTABLE VIBRATION DAMPER

BACKGROUND OF THE INVENTION

1. Field of the Invention

This invention relates to a valve system for a hydraulic, adjustable vibration damper with a piston fastened to a piston rod, which piston divides a work cylinder into two work chambers filled with damping fluid, whereby at least partly to control the damping force, there is a valve system with at least one electromagnetically activated valve, respectively consisting of a housing, a coil, an armature and a nonreturn body.

2. Background Information

The prior art includes valve systems for hydraulic, adjustable vibration dampers (e.g. German Laid Open Patent Appln. No. 39 36 453), on which there is a valve system consisting of at least one valve to control the damping force, and whereby, to achieve a secure electrical connection, after the coil body is inserted into the nonreturn body, the individual magnet covers are encased in plastic.

The contact points between the nonreturn body and the valve casing contribute to the possibility of leakage of undesirable components into the structure and the electromagnetic assembly into the entire valve assembly. A surface treatment, e.g. galvanizing, means on one hand a reduction of the quality of fit, since the zinc coating is uneven, and on the other hand a loss of magnetic force, since zinc does not have ferromagnetic characteristics. Therefore, even with thin coatings which are resistant to corrosion, care must be taken that the contact points do not attract moisture. Any corrosion which may occur at this gap can result in the failure of the entire valve.

Encasing the valve body, after it is introduced into the nonreturn body, by spraying it over with an appropriate plastic does not achieve the required tightness. Even with a coil complex and a nonreturn body which are manufactured separately and then connected to one another by means of adhesive, the proper seal cannot always be guaranteed, since the coil becomes extremely hot during operation, and hairline cracks, at the very least, can be expected on account of the stresses between the different types of materials.

OBJECT OF THE INVENTION

The object of the invention is to design a valve system with at least one solenoid valve so that economical components can be easily combined into a single unit, whereby a secure seal is guaranteed between the nonreturn body and the armature.

SUMMARY OF THE INVENTION

The invention teaches that this object can be accomplished by locating a seal element between the coil, which is surrounded by a plastic material, and the nonreturn body.

One advantage of this solution is that the nonreturn body and the coil complex can be manufactured as separate components. It can also be easily verified that not only are the contact points between the nonreturn body and the valve casing as tight as possible, but also that they are metallically bright, before the unit is assembled, at which point it can be sealed against the atmosphere by means of the seal element.

Another essential characterizing feature of the invention is that the seal element is an O-ring located in a recess.

In an additional configuration, the seal element is under an extremely smooth prestress. The metal and/or the plastic comprising the seal elements and/or making contact with the seal element are preferably very smooth and further are preferably highly reflective and bright and yet further are preferably polished or mirror-like. These bright surfaces are configured to cooperate with the seal element such that there is virtually no leakage about the seal element.

In an additional favorable embodiment, the seal seat of the seal element has an outline which is not circular. The outline of the seal seat is therefore a function of the coil complex. In the vicinity of the seal seat, the shape can be a rectangle with rounded corners, and depending on the dimensions of the coil, a square is even possible.

In one favorable embodiment, additional openings in the nonreturn body are also closed by means of seals.

One aspect of the invention resides broadly in a vibration damper for motor vehicles, the damper comprising a cylinder assembly having an arrangement for varying damping of a piston assembly disposed therein, the piston assembly dividing the cylinder into at least two chambers, each for containing damping fluid, the vibration damper comprising: means for throttling the damping fluid when the damping fluid moves from one of the chambers into another; the piston assembly having a piston rod and piston; the piston rod having first means for attachment of the piston rod at one end thereof; the cylinder assembly having second means for attachment at a portion thereon other than the first means for attachment at the piston rod; means for bypassing damping fluid between the at least two chambers; the valve means in bypassing means; the valve means for regulating flow of the damping fluid in the bypassing means; and the valve means comprising: an electromagnetic valve having a valve seat and a displaceable component for opening and closing against the valve seat and for regulating flow of the damping fluid in the bypassing means; the displaceable component being displaceable between a closed position and an open position, the displaceable component being disposed against the valve seat in the closed position, the displaceable component being disposed away from the valve seat in the open position; coil means for displacing the displaceable component between the open and closed positions; housing means into which the coil means is at least partially disposed; a sealing element being disposed between the coil means and the housing means to substantially seal at least a portion of at least the coil means from the environment about the valve means.

Another aspect of the invention resides broadly in a valve for controlling a vibration damper in motor vehicles, the damper comprising a cylinder assembly having an arrangement for varying damping of a piston assembly disposed therein, the piston assembly dividing the cylinder into at least two chambers, each for containing damping fluid, the vibration damper comprising: means for throttling the damping fluid when the damping fluid moves from one of the chambers into another; the piston assembly having a piston rod and piston; the piston rod having first means for attachment of the piston rod at one end thereof; the cylinder assembly having second means for attachment at a portion thereon other than the first means for attachment at the piston rod; means for bypassing damping fluid between the at least two chambers; the valve being configured for being disposed in the bypassing means for regulating flow of the damping fluid in the bypassing means; and the valve comprising: an electromagnetic valve having a valve seat and a displaceable component for opening and closing against the valve seat and for regulating flow of the damping fluid in the bypassing means; the displaceable component being displaceable between a closed position and an open position, the displaceable component being disposed against the valve seat in the closed position, the displaceable component being disposed away from the valve seat in the open position; coil means for displacing displaceable component between the open and closed positions; housing means into which the coil means is at least partially disposed; a sealing element being disposed between the coil means and the housing means to substantially seal at least a portion of at least the coil means from the environment about the valve means.

Another aspect of the invention resides broadly in a method of assembling a vibration damper for motor vehicles, the damper comprising a cylinder assembly having an arrangement for varying damping of a piston assembly disposed therein, the piston assembly dividing the cylinder into at least two chambers, each for containing damping fluid, the vibration damper comprising: means for throttling the damping fluid when the damping fluid moves from one of the chambers into another; the piston assembly having a piston rod and piston; the piston rod having first means for attachment of the piston rod at one end thereof; the cylinder assembly having second means for attachment at a portion thereon other than the first means for attachment at the piston rod; means for bypassing damping fluid between the at least two chambers; valve means in the bypassing means; the valve means being configured for being disposed in the bypassing means for regulating flow of the damping fluid in the bypassing means; and the valve means comprising: an electromagnetic valve having a valve seat and a displaceable component for opening and closing against the valve seat and for regulating flow of the damping fluid in the bypassing means; the displaceable component being displaceable between a closed position and an open position, the displaceable component being disposed against the valve seat in the closed position, the displaceable component being disposed away from the valve seat in the open position; coil means for displacing the displaceable component between the open and closed positions; housing means into which the coil means is at least partially disposed; a sealing element being disposed between the coil means and the housing means to substantially seal at least a portion of at least the coil means from the environment about the valve means; the method comprising: providing the sealing element, the housing means and the coil means; disposing the sealing element at one of: the housing means and the coil means; initiating assembly of housing means and the coil means; and subsequently compressing the sealing means between the housing means and the coil means to seal out from at least a portion of the coil means an environment about the valve means.

BRIEF DESCRIPTION OF THE DRAWINGS

Preferred embodiments of the invention are illustrated schematically in the accompanying drawings.

DESCRIPTION OF THE PREFERRED EMBODIMENTS

Figure 1:
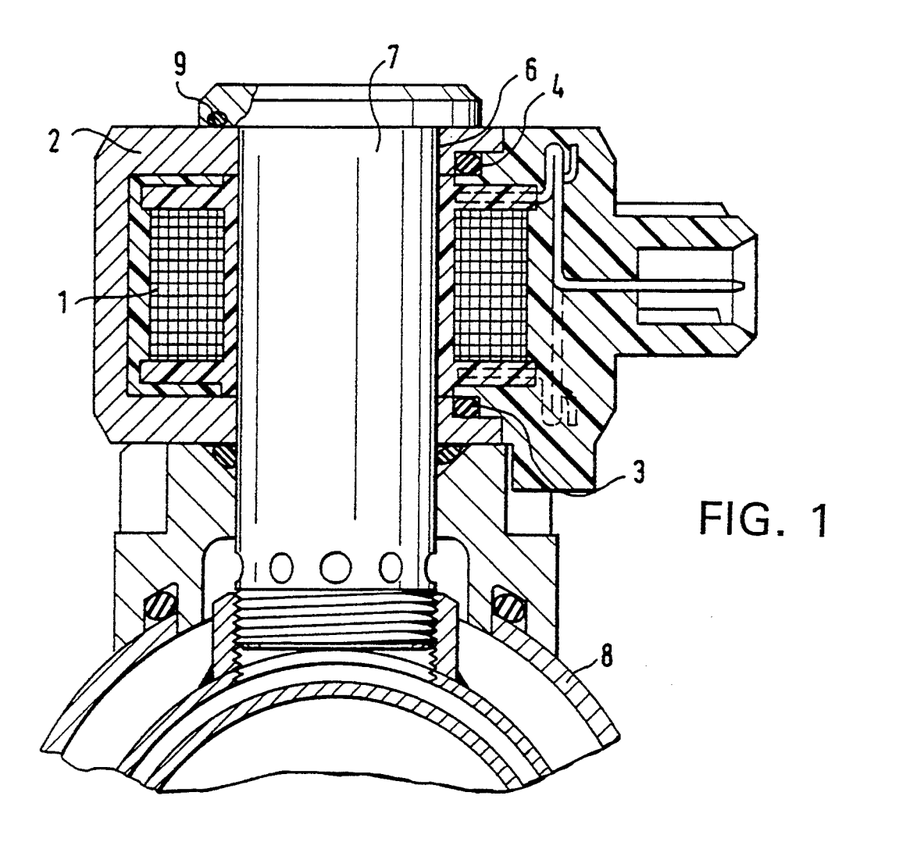
FIGS. 1, 1A, 2, and 2A show a solenoid valve in cross section in the vicinity of the vibration damper.
Figure 1A:
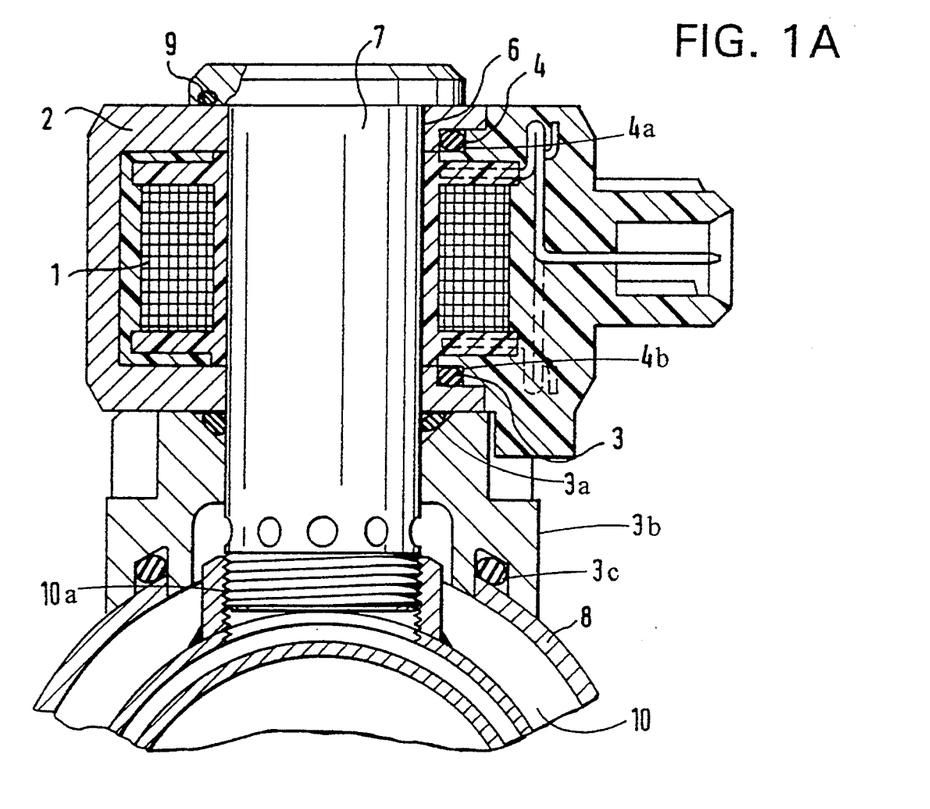

The solenoid valve illustrated in FIGS. 1 and 1A consists essentially of the nonreturn body 2, the coil 1 and the valve casing 7, inside which is the armature of the electromagnetic valve. The solenoid valve is flange-mounted on an external tube 8 of a vibration damper 10.

The nonreturn body 2 may typically be made from a metal which preferably in one embodiment is ferromagnetic. This nonreturn body 2 forms the case for holding the coil assembly 1.

To prevent moisture from getting between the abutting surfaces of the nonreturn body 2 and the coil 1, in the vicinity of the contact :surfaces between the valve casing 7 and the coil 1, there is a seal element 3 located in a recess 4. Since the nonreturn body 2 has an additional opening 6 to hold the valve casing 7, there is an additional seal 9 between the nonreturn body 2 and the valve casing 7.

In an additional embodiment, the solenoid valve illustrated in FIG. 1A may be disassembled by first removing the valve casing 7, inside which is the armature of the electromagnetic valve, from a vibration damper 10. After removing the valve casing 7, the coil or coil assembly 1 may in an additional embodiment of the invention then be removed from the nonreturn body 2.

The valve casing 7 is screwed into the vibration damper 10 by means of screw threads 10a. Between the nonreturn body 2 and the external tube 8 of the vibration damper 10 there is a collar 3b which rests against both the nonreturn body 2 and the external tube 8. Between the valve casing 7, the nonreturn body 2 and the collar 3b there is disposed in a recess a seal element 3a. Additionally between the collar 3b and the external tube 8 there is a disposed seal element 3c. All of the seal elements, that is, seal elements 3, 3a, and 3c may be O-rings.

Figure 2:
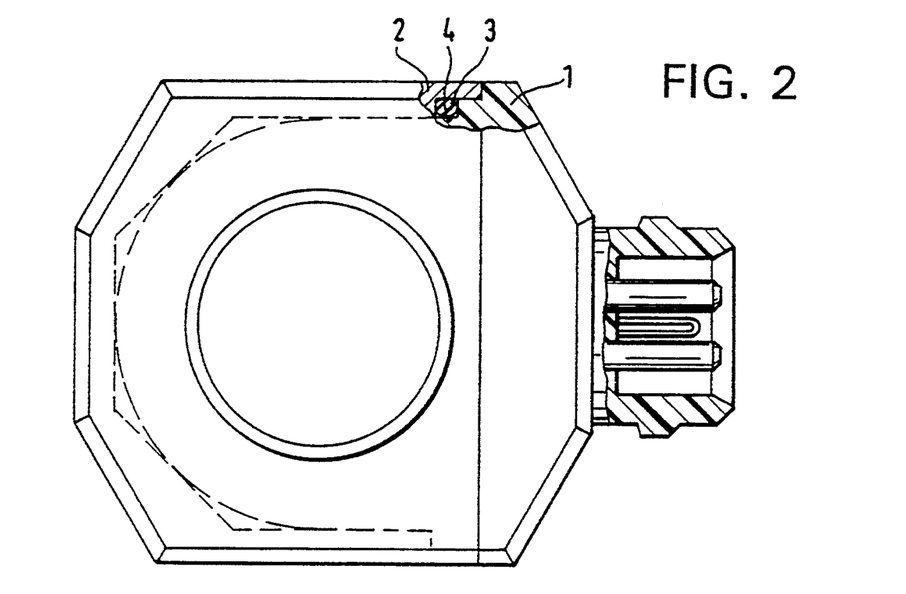

FIG. 2 shows that the nonreturn body 2 and the coil 1 together form a recess 4 into which the seal element 3 is inserted.

In this additional embodiment of the invention, the solenoid valve illustrated in FIG. 1A may be assembled from the parts which are the sealing element 3 and the coil assembly 1 by first inserting the coil assembly 1, with the seal element 3 inserted thereon, in the location of the recess 4 by sliding the coil assembly 1 into the cavity within the nonreturn body 2 applying pressure to the coil assembly 1 preferably to compress the seal element 3 and then sliding the valve casing 7 with its contents down through the hole in the coil assembly 1. The valve casing 7 is then screwed into the vibration damper 10 while the coil assembly 1 is held within the cavity of return body 2 preferably by compressing the seal element 3.

Preferably the surfaces that contact the seal element 3, which is preferably an O-ring, should be at least one of: smooth or highly reflective or polished or mirror like in their surface characteristics. This preferably extremely smooth surface is especially important in the case of the portions of the preferably metal nonreturn body 2 which make contact with the seal element 3 and also in alternative embodiments the preferably plastic surfaces of the coil assembly 1 could preferably also have surfaces with characteristics of a similar nature as those of the nonreturn body 2. The bright surface characteristics may be in various embodiments of varying smoothness depending upon among other factors upon the characteristics of the seal element 3. The smooth surfaces may have a smoothness in the order of a few microns of roughness and may in certain embodiments be one, two, three, four, five, ten, twenty, fifty, one hundred microns or any of the ranges between these values or may be one-tenth or one-hundredth of these values, alternatively these roughnesses may be ten or one hundred times larger.

The other seals and sealing elements described below may also in some embodiments be held in recesses that have the same or similar surface characteristics as those of recess 4.

The seal element 3 and the surfaces which comprise the recess 4 which receive the seal element 3 preferably form a generally rectangular cavity which extends perpendicular to the paper of the view of FIG. 1. This extension into the paper is in one embodiment substantially straight, that is, extending from one side of the coil assembly 1 and the nonreturn body 2 to the other side.

Figure 2A:
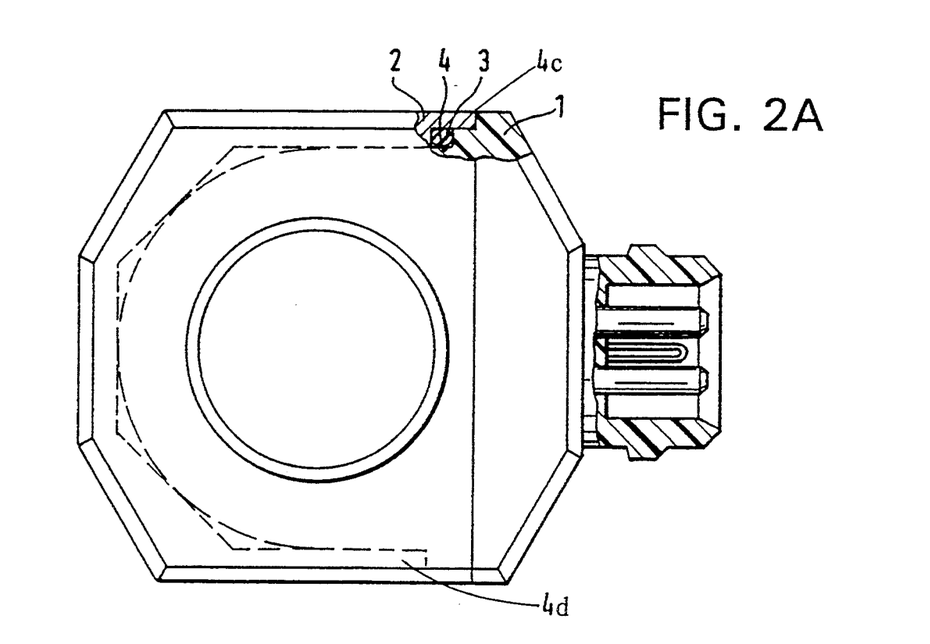

In FIG. 2A the recess 4 and seal element 3 are also shown extending into the plane of the paper of FIG. 2. The sealing element 3 and the recess 4 extend in one embodiment substantially straight from the top of the seal element shown in FIG. 1 to the bottom of the seal element shown in FIG. 1 on both sides of the nonreturn body 2 and the coil assembly 1 as shown in FIG. 2. In other words, as shown in FIG. 2, the seal element extends from the lower portion of FIG. 2 to the upper portion where the cross-hatched area is shown. Then, the seal element extends from the top to the bottom of the nonreturn body 2, that is, as shown in FIG. 1A from the top of the coil assembly 4a to the bottom of the coil assembly 4b in the section that forms the recess 4. The sealing element 3 then extends across the bottom of the recess 4 as shown in the coil assembly 4b, that is, between recess portion 4c and recess portion 4d, as shown in FIG. 2A. The seal element then extends up though recess portion 4d between coil assembly 4b and coil assembly 4a as shown in FIG. 1A. Therefore, in one embodiment, the seal element 3 assumes a substantially rectangular shape when traversing the substantially rectangular recess 4 which holds the seal element 3.

Figures 3, 4, 5, 6, 7:
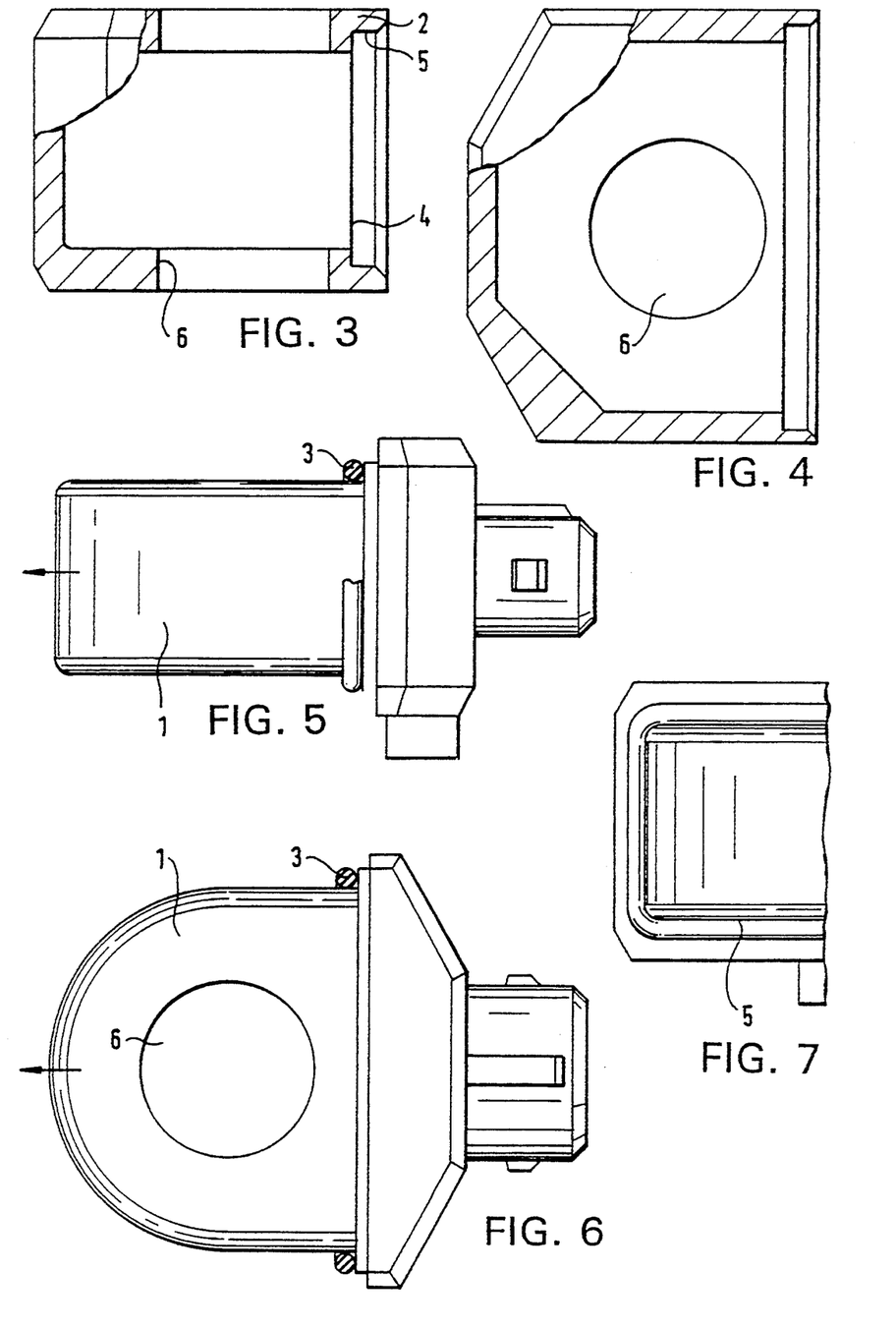
FIGS. 3 to 7 show various views of the nonreturn body and of the coil.

FIGS. 3 to 7 show the nonreturn body 2 as an isolated part, whereby the recess 4 which forms the seal seat 5 is used to hold the seal element 3. FIG. 7 shows that the seal seat 5 has the form of an approximately rectangular seal seat 5 which is not circular. In these embodiments, the coil 1 is inserted laterally into the nonreturn body 2, whereby the openings 6 are used to hold the valve casing, and are also sealed against the atmosphere by means of the seal 9 (FIG. 1).

Figure 8:
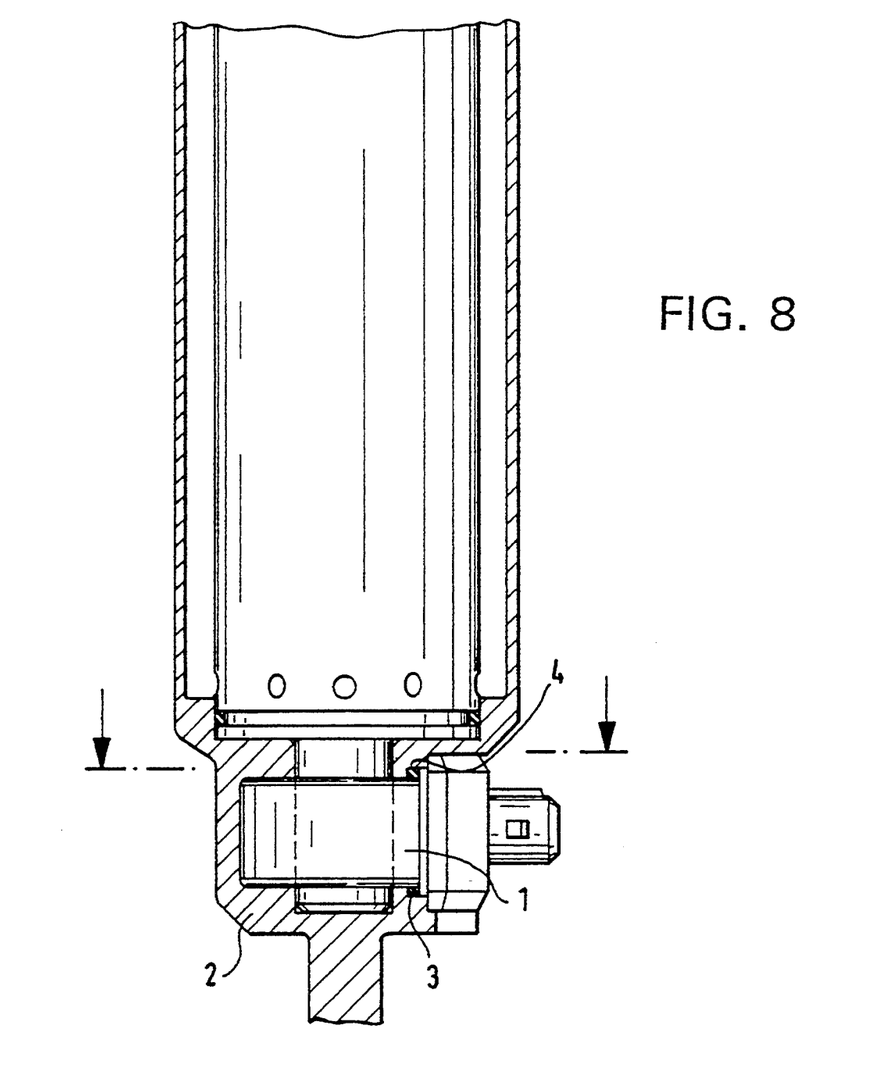
FIGS. 8 to 9 illustrate an additional embodiment of a solenoid valve, which is located in the vicinity of the bottom of a vibration damper.
Figure 9:
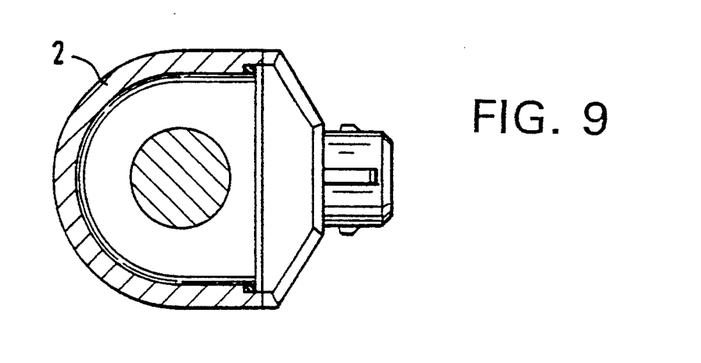

FIGS. 8 and 9 show a solenoid valve in which the coil 1 is located in the bottom of a vibration damper, whereby the nonreturn body 2 is formed directly by the vibration damper itself. In this embodiment, too, a corresponding seal element 3 is inserted into a recess 4, so that no or virtually no moisture from the atmosphere can penetrate into the solenoid valve.

Figure 10:
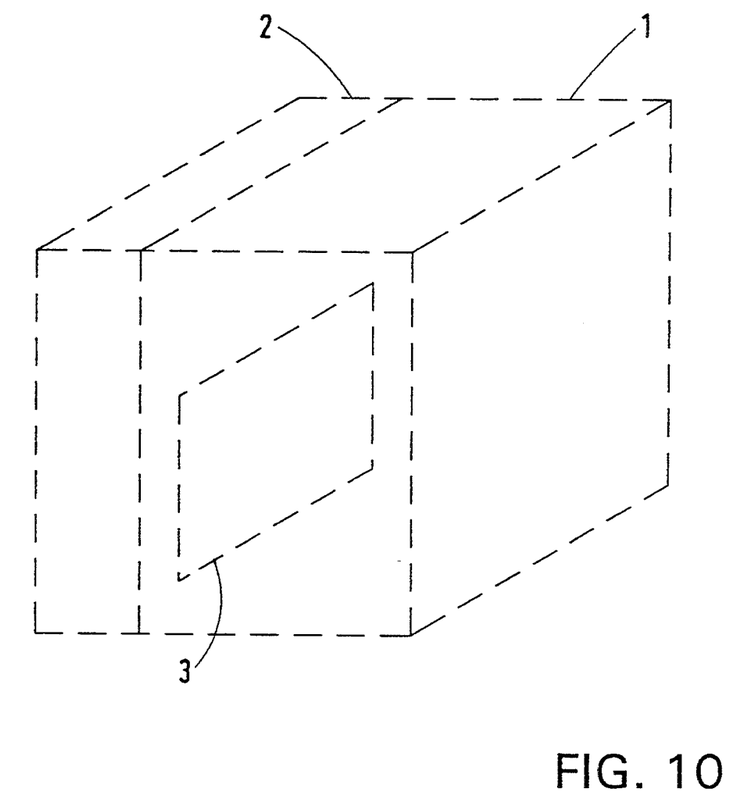
FIG. 10 illustrates the solenoid valve assembly in phantom.

Referring now to FIG. 10, the coil assembly 1 and nonreturn body 2 are shown in phantom with the rectangular recess 4 (not shown) and the rectangularly shaped seal element 3, shaped rectangular by the recess 4 (not shown), enclosed within the assembled coil assembly 1 and the nonreturn body 2.

Figure 11:
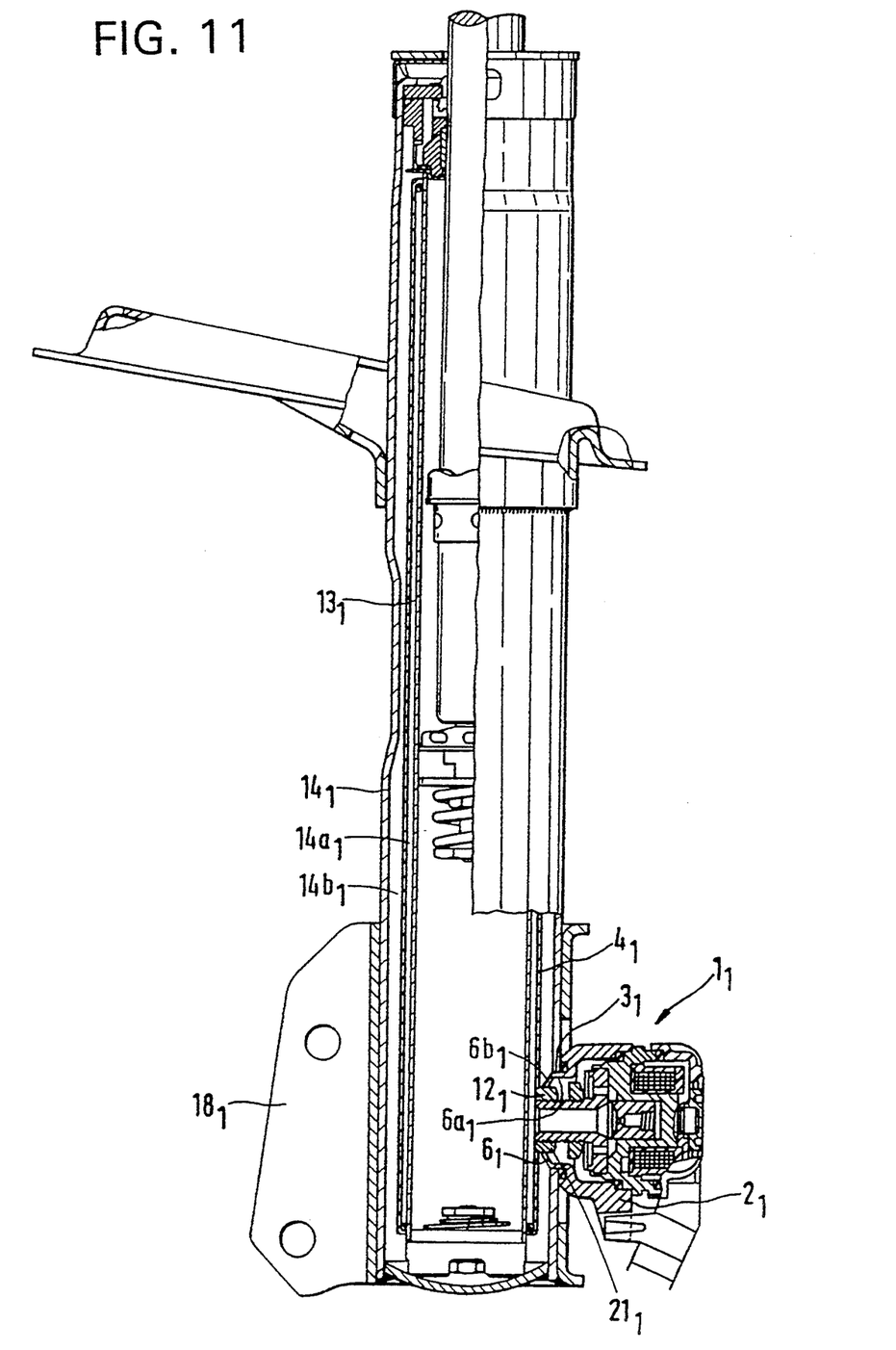
FIG. 11 shows a solenoid valve in cross section attached to a vibration damper or shock absorber.

FIG. 11, which is based on a conventional vibration damper like the one illustrated in FIG. 1, shows a version in which a damping valve $1_1$ is installed on the side. This damping valve $1_1$ is located in the vicinity of the bracket $18_1$. The only difference from the conventional vibration damper illustrated in FIG. 1 is that in the equalization chamber between the work cylinder $13_1$ and the jacket tube $14_1$ there is an additional tube $4_1$, which is equipped with a threaded ring $12_1$, so that all that is required for the installation of the damping valve $1_1$ is a hole $3_1$ in the jacket tube $14_1$. By means of the centering ring $2_1$, which is centered with its extension $6_1$ in the hole $3_1$ of the jacket tube $14_1$, and by means of the screw fitting which runs through the centering ring $2_1$ on the threaded ring $12_1$, the damping valve $1_1$ can be used with a minimum of effort and expense on a conventional vibration damper like the one illustrated in FIG. 1.

Figure 12:
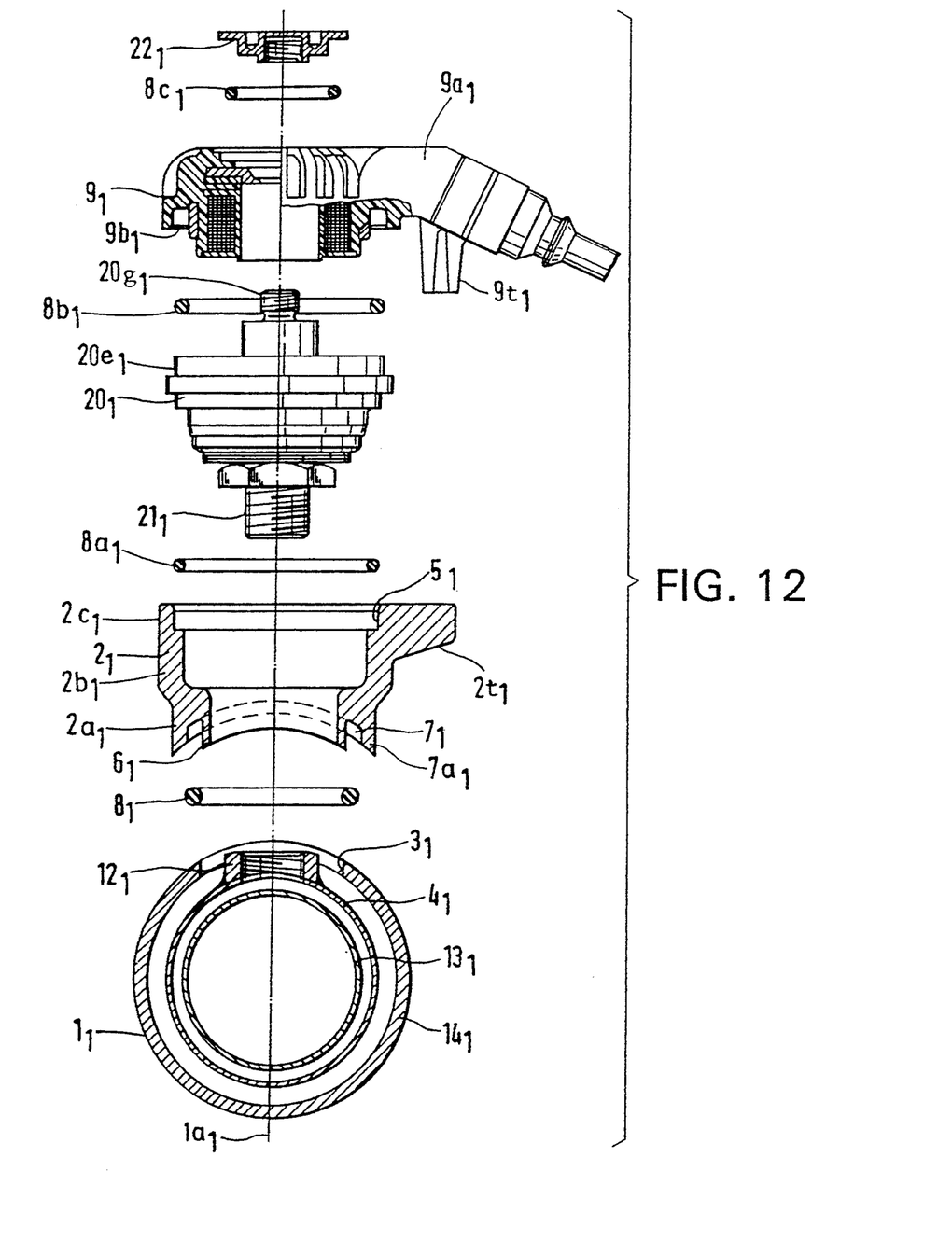
FIG. 12 shows an exploded view of the individual parts of a controllable damping valve located on the side of a vibration damper.

In FIG. 12, which shows the work cylinder $13_1$ and the jacket tube $14_1$, the tube $4_1$ is located inside the equalization chamber and is equipped with a threaded ring $12_1$. To this base, the gasket $8_1$, the centering ring $2_1$, an additional gasket, the valve core $20_1$ and finally the housing $9_1$ with the electrical parts are threaded on.

By means of the screw fitting $21_1$, the valve core $20_1$ with the centering ring $2_1$ is held by means of the threaded ring $12_1$ in the tube $4_1$, while an additional screw fitting $22_1$ fixes the housing $9_1$ in relation to the valve core $20_1$. The centering ring $2_1$ is provided with a groove $7_1$ to hold the gasket $8_1$ and with an extension $6_1$ for centering in the hole $3_1$ of the jacket tube $14_1$. As a result of the screw fitting $21_1$, which extends through the centering ring $2_1$, a proper seal of the centering ring $2_1$ with the gasket $8_1$ against the outer surface of the jacket tube $14_1$ is guaranteed. To hold the valve core $20_1$, the centering ring $2_1$ is provided with an additional hole $5_1$.

FIG. 11, which is based on a conventional vibration damper like the one illustrated in FIG. 1, shows a version in which a damping valve $1_1$ is installed on the side of the vibration damper. This damping valve $1_1$ is located in the vicinity of the bracket $18_1$. There may be only two modifications to a conventional vibration damper like the one illustrated in FIG. 1 required in order to be able to install the damping valve $1_1$ on the side of the vibration damper. One modification may be the addition of the tube $4_1$ which is equipped with the threaded ring $12_1$. The threaded ring $12_1$ has an inside radial edge. Preferably the tube $4_1$ has a hole aligned with the inside radial edge of the threaded ring $12_1$. Such a hole in the tube $4_1$ would allow damping fluid to flow between the damping valve $1_1$ and one or two of the work chambers of the work cylinder $13_1$. The other modification may be the cutting of the hole $3_1$ in the jacket tube $14_1$. Preferably the hole $3_1$ is centered on the threaded ring $12_1$. By means of the centering ring $2_1$, which is centered with its extension $6_1$ in the hole $3_1$ of the jacket tube $14_1$, and by means of the screw fitting $21_1$ which runs through the centering ring $2_1$ on the threaded ring $12_1$, the damping valve $1_1$ can be installed with a minimum of effort and expense on a conventional vibration damper like the one illustrated in FIG. 1.

As shown in FIG. 11, the tube $4_1$ may divide the equalization chamber into an equalization subchamber $14a_1$ inside the tube $4_1$ and an equalization subchamber $14b_1$ outside the tube $4_1$. The extension $6_1$ is shown as having a cylindrical section $6a_1$ extending through the jacket tube $14_1$ from outside. The extension $6_1$ is also shown as having a conical section $6b_1$ extending from the cylindrical section $6a_1$ inward toward the tube $4_1$ and inward radially with respect to the cylindrical section $6a_1$. The conical section $6b_1$ is shown as contacting the threaded ring $12_1$ on the outer circumferential surface of the threaded ring $12_1$. The conical section $6b_1$ may facilitate centering the centering ring $2_1$ on the threaded ring $12_1$. The conical section $6b_1$ preferably does not contact the threaded ring $12_1$ around the entire circumference of the threaded ring $12_1$. In some embodiments it may be preferable or necessary that a gap between the extension $6_1$ and the threaded ring $12_1$ be a part of a passage through the damping valve $1_1$ to the equalization subchamber $14a_1$.

FIG. 12 shows the work cylinder $13_1$, the tube $4_1$ and the jacket tube $14_1$ generally substantially equivalent to those same components shown in FIG. 1 and FIG. 11, as being substantially coaxial and therefore having substantially coinciding longitudinal axes. An axis $1a_1$ preferably passes through the longitudinal axis of the tube $4_1$ and is transverse, preferably perpendicular, to the longitudinal axis of the tube $4_1$.

The tube $4_1$ is preferably equipped with a threaded ring $12_1$. The threaded ring $12_1$ is preferably centered on axis $1a_1$. The threaded ring $12_1$ has an inner radial surface and an outer radial surface. Preferably the inner radial surface of the threaded ring $12_1$ is threaded and the outer radial surface of the threaded ring $12_1$ is not. The threaded ring $12_1$ is preferably rigidly attached to the tube $4_1$ by welding or some other means. Any welds between the threaded ring $12_1$ and the tube $4_1$ are preferably on the outer radial surface of the threaded ring $12_1$. The jacket tube $14_1$ has an inner surface and an outer surface. The threaded ring $12_1$ preferably extends from the tube $4_1$ past the inner surface of the jacket tube $14_1$, but not past the outer surface of the jacket tube $14_1$.

The tube $4_1$ preferably has a hole centered on axis $1a_1$, which hole preferably is aligned with the inside radial surface of the threaded ring $12_1$.

The hole $3_1$ in the jacket tube $14_1$ is preferably centered on axis $1a_1$. The hole $3_1$ preferably is shaped such that the entire edge of the hole $3_1$ would contact a cylinder inserted into the hole $3_1$ with the longitudinal axis of the cylinder oriented parallel to axis $1a_1$. Therefore, the hole $3_1$ preferably appears circular when viewed from a distance along axis $1a_1$.

The centering ring $2_1$ is preferably centered on axis $1a_1$. The centering ring $2_1$ has a first end and a second end along axis $1a_1$, with the first end being adjacent to the jacket tube $14_1$. The first end of the centering ring $2_1$ has an extension $6_1$. The extension $6_1$ is preferably centered on axis $1a_1$ and cylindrical. The extension $6_1$ has an outer radial surface, which outer radial surface has a diameter, which diameter is such that the extension $6_1$ can fit, preferably snugly, into the hole $3_1$. Preferably the extension $6_1$ extends from outside the jacket tube $14_1$ to the inner surface of the jacket tube $14_1$. Preferably the extension $6_1$ is flush with the inner surface of the jacket tube $14_1$ and follows the contour of the inner surface of the jacket tube $14_1$. Therefore, extension $6_1$ has an edge which edge preferably is shaped such that the entire edge would contact a cylinder having a longitudinal axis parallel to the longitudinal axis of the tube $4_1$.

The first end of the centering ring $2_1$ preferably has an extension $7a_1$. The extension $7a_1$ is preferably centered on axis $1a_1$ and cylindrical. The extension $7a_1$ has an inner radial surface, which inner radial surface has a diameter, which diameter is greater than the diameter of the outer radial surface of the extension $6_1$. The extension $7a_1$ preferably follows the contour of the outer surface of the jacket tube $14_1$. Preferably the extension $7a_1$ is the part of the centering ring $2_1$ that rests against the outer surface of the jacket tube $14_1$ and thereby prevents the centering ring $2_1$ from moving closer to the tube $4_1$.

The first end of the centering ring $2_1$ preferably has a groove $7_1$. The groove $7_1$ is preferably centered on axis $1a_1$ and cylindrical. The groove $7_1$ is preferably formed by the inner radial surface of the extension $7a_1$ and the outer radial surface of the extension $6_1$. The dimensions of the groove $7_1$ are preferably such that an effective seal between the centering ring $2_1$ and the jacket tube $14_1$ can be created by a gasket $8_1$ inserted in the groove $7_1$.

The centering ring $2_1$ has a hole $5_1$. The hole $5_1$ is preferably centered on axis $1a_1$. The hole $5_1$ may have sections having different diameters, and therefore the centering ring $2_1$ may have corresponding sections having different inside diameters. The configuration of the hole $5_1$ for a particular embodiment of the invention may be strongly influenced by the design of the valve core used in the particular embodiment. In the embodiment shown in FIG. 12, the centering ring $2_1$ has a first section $2a_1$ having a first inside diameter at the first end of the centering ring $2_1$. The first section $2a_1$ of the centering ring $2_1$ extends from the first end toward the second end of the centering ring $2_1$ past the extension $6_1$. Further from the first end of the centering ring $2_1$, the centering ring $2_1$ has a second section $2b_1$ having a second inside diameter, the second inside diameter being greater than the first inside diameter. Still further from the first end of the centering ring $2_1$, the centering ring $2_1$ has a third section $2c_1$ having a third inside diameter, the third inside diameter being greater than the second inside diameter. The centering ring $2_1$ has an annular surface between the second section $2b_1$ and the third section $2c_1$. Preferably the gasket $8a_1$ can be placed on the annular surface between the section $2b_1$ and the third section $2c_1$ to form a seal between the centering ring $2_1$ and the valve core $20_1$. Finally, the centering ring $2_1$ may have a chamfer adjacent to the hole $5_1$ at the second end of the centering ring $2_1$. The chamfer might facilitate the insertion of the valve core $20_1$ into the hole $5_1$.

The outside diameter of the centering ring $2_1$ may vary.

The centering ring $2_1$ preferably has at least one tab $2t_1$. The tab $2t_1$ preferably extends radially outward from the outer surface of the centering ring $2_1$. The tab $2t_1$ is preferably on the second end of the centering ring $2_1$.

The valve core $20_1$ is preferably centered on axis $1a_1$. The valve core $20_1$ has a first end and a second end along axis $1a_1$, with the first end being located between the work cylinder $13_1$ and the second end. The first end of the valve core $20_1$ preferably has a screw fitting $21_1$. The screw fitting $21_1$ is preferably rigidly attached to the valve core $20_1$. The screw fitting $21_1$ has a length along axis $1a_1$. The screw fitting $21_1$ is preferably hollow along the entire length of the screw fitting $21_1$. Preferably the screw fitting $21_1$ has an inner radial surface and an outer radial surface. Preferably the outer radial surface of the screw fitting $21_1$ is threaded and the inner radial surface of the screw fitting $21_1$ is not. Preferably the screw fitting $21_1$ is threaded such that the screw fitting $21_1$ and the threaded ring $12_1$ may threadedly engage each another.

The second end of the valve core $20_1$ preferably has a screw fitting $20g_1$. The screw fitting $20g_1$ is preferably rigidly attached to the valve core $20_1$. The screw fitting $20g_1$ has an outer radial surface. Preferably the outer radial surface of the screw fitting $20g_1$ is threaded.

The valve core $20_1$ has a first outer radial surface. The first outer radial surface of the valve core $20_1$ may have several sections having different diameters. The valve core $20_1$ may have an annular portion $20e_1$.

The damping valve $1_1$ preferably has a housing $9_1$ containing the electrical parts of the damping valve $1_1$. The housing $9_1$ is preferably centered on axis $1a_1$. The housing $9_1$ has a first end and a second end along axis $1a_1$, with the first end being located between the work cylinder $13_1$ and the second end. The electrical parts preferably are disposed in the housing $9_1$ at the first end of the housing $9_1$. The first end of the housing $9_1$ preferably has a groove $9b_1$ located radially outside the electrical parts. Preferably the damping valve $1_1$ has a gasket $8b_1$. Preferably the gasket $8b_1$ is disposed in the groove $9b_1$. Preferably the annular portion $20e_1$ of the valve core $20_1$ can be disposed in the groove $9b_1$ over the gasket $8b_1$, thereby forming a seal between the valve core $20_1$ and the housing $9_1$.

The housing $9_1$ preferably has an electrical socket $9a_1$. Preferably the electrical socket $9a_1$ extends radially outward from the housing $9_1$. In the embodiment shown in FIG. 12, the housing $9_1$ preferably has two tabs $9t_1$. Preferably there is a space between the two tabs $9t_1$. Preferably the space between the two tabs $9t_1$ is aligned with the tab $2t_1$ of the centering ring $2_1$. Preferably the tab $2t_1$ can snugly fit in the space between the two tabs $9t_1$, thereby protecting the housing $9_1$ from twisting relative to the centering ring $2_1$. The two tabs $9t_1$ may be disposed on the electrical socket $9a_1$. The centering ring $2_1$ may have more than one tab $2t_1$ around the circumference of the centering ring $2_1$ so that the housing $9_1$ may be placed at more than one position where the housing $9_1$ is protected from twisting relative to the centering ring $2_1$.

The electrical parts are preferably aligned on axis $1a_1$. The housing $9_1$ is preferably hollow along axis $1a_1$ such that the second end of the valve core $20_1$ may be inserted into the housing $9_1$ radially inside the electrical parts.

The damping valve $1_1$ preferably has a screw fitting $22_1$. The screw fitting $22_1$ preferably has an inner radial surface, which inner radial surface is preferably threaded such that the screw fitting $22_1$ and the screw fitting $21_1$ may threadedly engage each other. The damping valve $1_1$ preferably has a gasket $8c_1$. The second end of the housing $9_1$ preferably has a recess such that the gasket $8c_1$ may be disposed in the recess, and such that the screw fitting $22_1$ may be disposed over the gasket $8c_1$ and tightened onto the screw fitting $21_1$, thereby sealing the second end of the housing $9_1$.

Figure 12A:
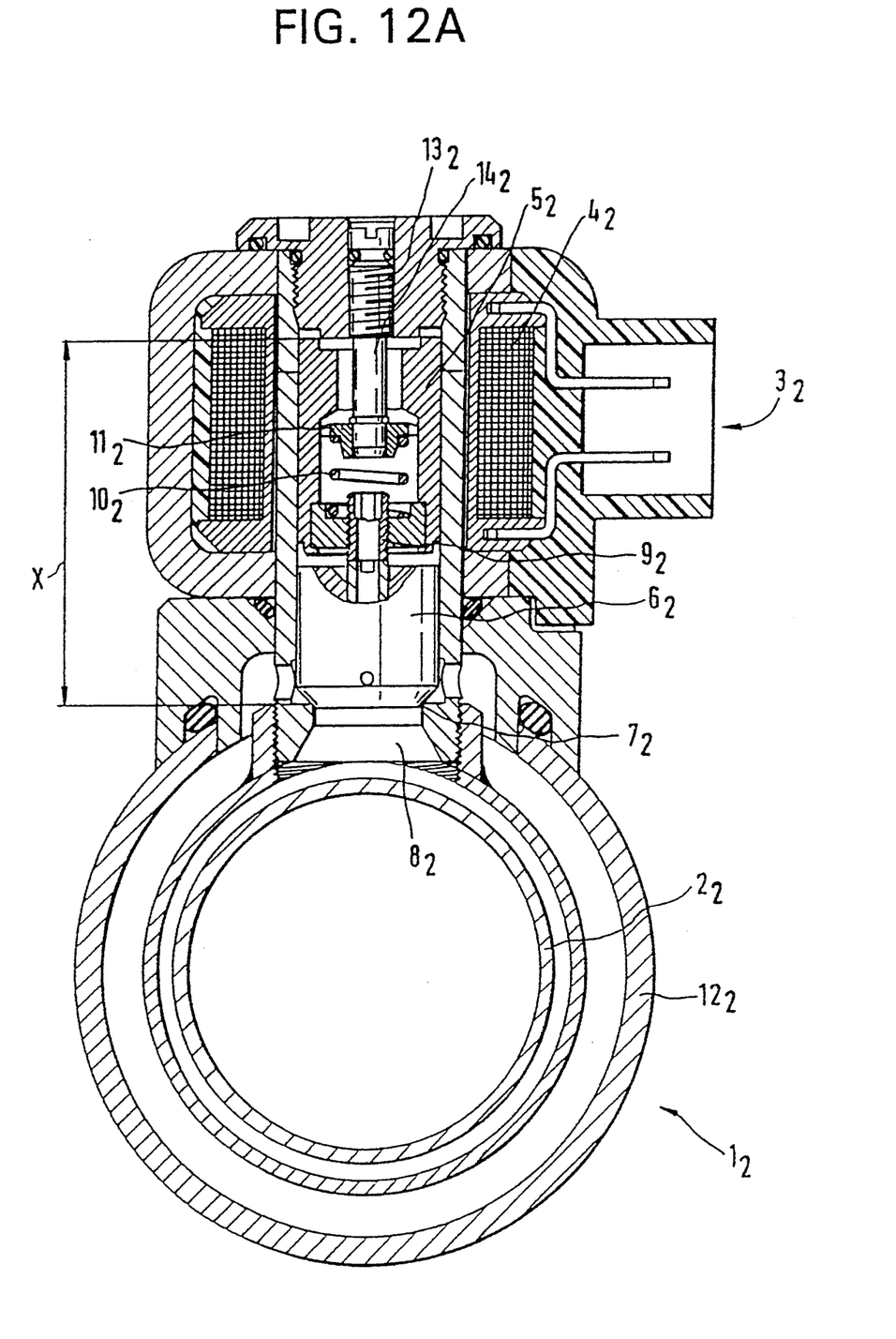
FIG. 12A shows a cross section of a solenoid valve with the internal parts within the valve casing visible.

The embodiment illustrated in FIG. 12A shows a vibration damper $1_2$, of generally the same type as shown in FIG. 1, in cross section, wherein for purposes of simplification, the work piston and the piston rod are not shown. The work cylinder $2_2$ is surrounded by a jacket tube $12_2$, on the outer circumferential surface of which there is an electrically controllable damping valve $3_2$. The electrically controllable damping valve $3_2$ comprises in particular the coil $4_2$, the armature $5_2$ and the valve body $6_2$. The valve body $6_2$ forms a valve seat $7_2$, so that the flow passage $8_2$ can be opened or closed.

The armature $5_2$ is equipped with an adjusting screw $9_2$, so that by means of an appropriate adjustment of the valve body $6_2$, contact takes place. By means of an appropriate setting of the adjusting screw $9_2$, an appropriate distance X can be set from the valve seat $7_2$ to the upper end surface of the armature $5_2$, so that the valve stroke can be correctly adjusted. Before the plugs $13_2$ are installed, suitable tools can be used through the hole in the plugs $13_2$ to adjust the hexagonal socket of the adjusting screw $9_2$, so that the relative distance X can be set.

By means of the spring $10_2$ and the stop plate $11_2$, the pre-stress of the valve body $6_2$ can be set by installing the plugs $13_2$ at an appropriate distance on the pin $14_2$.

This embodiment relates to a piloted damping valve, wherein the individual parts which are necessary for the pilot control are located inside the inner chamber of the valve body $6_2$.

Now referring to FIG. 12A, this figure shows the internal structure of an electromagnetic valve with the internal structure within the valve casing $7_2$ shown in detail. This FIG. 12A does not show the seal element 3 nor the recess 4 as shown in FIG. 1 but could be incorporated therein in one embodiment.

One feature of the invention resides broadly in the valve system for a hydraulic, adjustable vibration damper with a piston fastened to a piston rod, which piston divides a work cylinder into two work chambers filled with damping fluid, whereby at least partly to control the damping force, there is a valve system with at least one electromagnetically activated valve, respectively consisting of a housing, a coil, an armature, and a nonreturn body, characterized by the fact that there is a seal element 3 between the coil 1, which is surrounded by a plastic material, and the nonreturn body 2.

Another feature of the invention resides broadly in the valve system, characterized by the fact that the seal element 3 is an O-ring located in a recess 4.

Yet another feature of the invention resides broadly in the valve system, characterized by the fact that the seal element 3 is under a prestress.

Still another feature of the invention resides broadly in the valve system, characterized by the fact that the seal seat 5 of the seal element 3 has an outline which is not circular.

Still yet another feature of the invention resides broadly in the valve system, characterized by the fact that additional openings 6 in the nonreturn body 2 are also closed by means of seals.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The corresponding foreign patent publication applications, are, Federal Republic of Germany Patent Application No. P 42 37 666, filed on Nov. 7, 1992, having inventor Hubert Beck, and DE-OS P 42 37 666 and DE-PS P 42 37 666.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid between said at least two chambers;

valve means in said bypassing means;

said valve means for regulating flow of said damping fluid in said bypassing means; and said valve means comprising:

an electromagnetic valve having a valve seat and a displaceable component for opening and closing against said valve seat and for regulating flow of said damping fluid in said bypassing means;

said displaceable component being displaceable between a closed position and an open position, said displaceable component being disposed against said valve seat in said closed position, said displaceable component being disposed away from said valve seat in said open position;

coil means for displacing said displaceable component between said open and closed positions;

housing means into which said coil means is at least partially disposed;

a sealing element being disposed between said coil means and said housing means to substantially seal at least a portion of at least said coil means from the environment about said valve means;

said coil means and said housing means together forming means for compressing said sealing element between said coil means and said housing means;

said coil means comprising a plastic material;

said plastic material comprising a surface;

said surface of said plastic material forming at least a portion of said means for compressing;

said housing means comprising a metal material;

said metal material comprising a surface;

said surface of said metal material forming at least a portion of said means for compressing; and said sealing element being in contact with and compressed between said surface of said plastic material and said surface of said metal material.

2. The vibration damper, according to claim 1, wherein said coil means is at least partially surrounded by a plastic material.

3. The vibration damper, according to claim 2, wherein said means for compressing comprises a recess to accept said sealing element.

4. The vibration damper, according to claim 3, wherein said sealing element comprises an O-ring.

5. The vibration damper, according to claim 1, wherein additional openings in said housing means are also closed by means of sealing elements.

6. The vibration damper, according to claim 3, wherein said recess extends about said valve means to form an elongated non-circular recess disposed about one of: said coil means and said housing means.

7. The vibration damper, according to claim 6, wherein at least a portion of at least one of: said surface of said plastic material and said surface of said metal material comprises a surface which is at least one of: mirror-like, smooth and polished.

8. The vibration damper, according to claim 6, wherein additional openings in said housing means are also closed by means of sealing elements.

9. A valve for controlling a vibration damper in motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid between said at least two chambers;

a valve being configured for being disposed in said bypassing means for regulating flow of said damping fluid in said bypassing means; and said valve comprising:

an electromagnetic valve having a valve seat and a displaceable component for opening and closing against said valve seat and for regulating flow of said damping fluid in said bypassing means;

said displaceable component being displaceable between a closed position and an open position, said displaceable component being disposed against said valve seat in said closed position, said displaceable component being disposed away from said valve seat in said open position;

coil means for displacing said displaceable component between said open and closed positions;

housing means into which said coil means is at least partially disposed;

a sealing element being disposed between said coil means and said housing means to substantially seal at least a portion of at least said coil means from the environment about said valve;

said coil means and said housing means together forming means for compressing said sealing element between said coil means and said housing means;

said coil means comprising a plastic material;

said plastic material comprising a surface;

said surface of said plastic material forming at least a portion of said means for compressing;

said housing means comprising a metal material;

said metal material comprising a surface;

said surface of said metal material forming at least a portion of said means for compressing; and said sealing element being compressed between said surface of said plastic material and said surface of said metal material.

10. The valve, according to claim 9, wherein said coil means is at least partially surrounded by a plastic material.

11. The valve, according to claim 10, wherein said means for compressing comprises a recess to accept said sealing element.

12. The valve, according to claim 11, wherein said sealing element comprises an O-ring.

13. The valve, according to claim 12, wherein said recess extends about the valve means to form an elongated non-circular recess disposed about one of: said coil means and said housing means.

14. The valve, according to claim 13, wherein at least a portion of at least one of: said surface of said plastic material and said surface of said metal material comprises a surface which is at least one of: mirror-like, smooth and polished.

15. A method of assembling a vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid between said at least two chambers;

valve means in said bypassing means;

said valve means being configured for being disposed in said bypassing means for regulating flow of said damping fluid in said bypassing means; and said valve means comprising:

an electromagnetic valve having a valve seat and a displaceable component for opening and closing against said valve seat and for regulating flow of said damping fluid in said bypassing means;

said displaceable component being displaceable between a closed position and an open position, said displaceable component being disposed against said valve seat in said closed position, said displaceable component being disposed away from said valve seat in said open position;

coil means for displacing said displaceable component between said open and closed positions;

housing means into which said coil means is at least partially disposed;

a sealing element being disposed between said coil means and said housing means to substantially seal at least a portion of at least said coil means from the environment about said valve means;

said coil means and said housing means together forming means for compressing said sealing element between said coil means and said housing means;

said coil means comprising a plastic material;

said plastic material comprising a surface;

said surface of said plastic material forming at least a portion of said means for compressing;

said housing means comprising a metal material;

said metal material comprising a surface;

said surface of said metal material forming at least a portion of said means for compressing;

said sealing element being compressed between said surface of said plastic material and said surface of said metal material;

said method comprising:

providing said sealing element, said housing means and said coil means;

disposing said sealing element at one of: said housing means and said coil means;

initiating assembly of said housing means and said coil means;

configuring said coil means and said housing means to together form means for compressing said sealing element between said coil means and said housing means;

configuring said coil means to comprise a plastic material, said plastic material comprising a surface;

configuring said surface of said plastic material to form at least a portion of said means for compressing;

configuring said housing means to comprise a metal material, said metal material comprising a surface;

configuring said surface of said metal material to form at least a portion of said means for compressing; and subsequently compressing said sealing means between said surface of said plastic material and said surface of said metal material to seal out from at least a portion of said coil means an environment about said valve means.

16. The method, according to claim 15, wherein said coil means is at least partially surrounded by a plastic material, and wherein said means for compressing comprises a recess to accept said sealing element.

17. The method, according to claim 16, wherein said sealing element comprises an O-ring;

wherein said recess extends about said valve means to form an elongated non-circular recess disposed about one of: said coil means and said housing means; and wherein at least a portion of at least one of: said surface of said plastic material and said surface of said metal material comprises a surface which is at least one of: mirror-like, smooth and polished.

18. The method, according to claim 17, wherein additional openings in said housing means are also closed by means of sealing elements.

* * * * *

UNITED STATES PATENT AND TRADEMARK OFFICE
CERTIFICATE OF CORRECTION

PATENT NO. : 5,435,421
DATED : July 25, 1995
INVENTOR(S) : Hubert BECK

It is certified that error appears in the above-indentified patent and that said Letters Patent is hereby corrected as shown below:

On the title page, item [56], under the "U.S. PATENT DOCUMENTS" section, before the 4,720,078 reference insert the following reference:
--2,964,030   12/1960   Werner--.

In column 8, line 54, after the second occurrence of 'the' insert --second--.

Signed and Sealed this

Nineteenth Day of November, 1996

Attest:

BRUCE LEHMAN

Attesting Officer        Commissioner of Patents and Trademarks